May 27, 1924.

H. LEE

SHOCK ABSORBER

Filed May 11, 1920

1,495,418

INVENTOR
Hoard Lee,
BY
Hardway & Cathey
ATTORNEYS.

Patented May 27, 1924.

1,495,418

UNITED STATES PATENT OFFICE.

HOARD LEE, OF SHREVEPORT, LOUISIANA.

SHOCK ABSORBER.

Application filed May 11, 1920. Serial No. 380,633.

*To all whom it may concern:*

Be it known that I, HOARD LEE, citizen of the United States, residing at Shreveport, in the parish of Caddo and State of Louisiana, have invented certain new and useful Improvements in a Shock Absorber, of which the following is a specification.

This invention relates to new and useful improvements in a shock absorber.

One object of the invention is to provide a device of the character described through which one end of a vehicle spring may be attached to the vehicle frame work and which will absorb the shock incident to the passing of the vehicle over rough and uneven roads.

Another object of the invention is to provide a shock absorber which is of simple construction and which may be cheaply and easily manufactured and easily applied to the vehicle.

With the above and other objects in view the invention has particular relation to certain novel features of construction, operation and arrangement of parts, an example of which is given in this specification illustrated in the accompanying drawings wherein, Figure 1 is a fragmentary view of a vehicle frame showing the spring and the shock absorber applied to said spring and frame.

Figure 1:
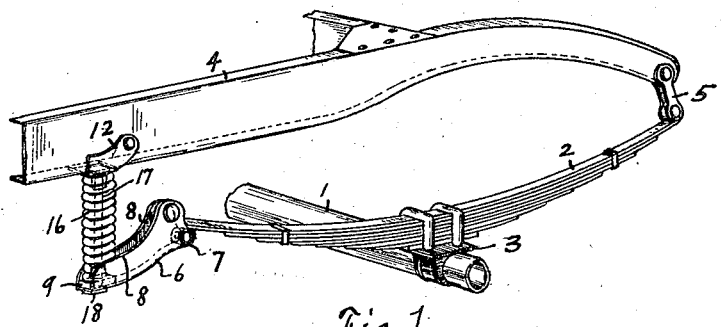
Figure 2:
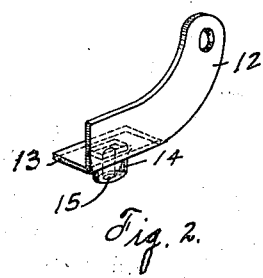
Figure 2 shows a perspective view of the connecting plate employed.
Figure 3:
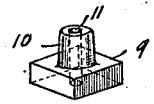
Figure 3 shows a perspective view of a bearing block.

Referring now more particularly to the drawings wherein like numerals of reference designate similar parts in each of the figures, the numeral 1 refers to the vehicle axle to which the spring 2 is secured by means of the usual clamp 3. The numeral 4 designates a side member of the frame work of the vehicle. One end of the spring is secured to the corresponding end of the side member 4 by means of the links 5. The other end of the spring 2 has the supporting bracket 6 pivoted thereto at its upper end which is provided with a bearing 7 adapted to contact with the under side of the adjacent end of said spring, to limit the downward movement of the bracket. This bracket is formed with the upstanding side flanges 8, 8 and located between them at the free end of the bracket there is the bearing block 9 having the upstanding stud 10 and the central bearing 11. Pivoted to the side of the member 4 there is a plate 12 having the overturned flange 13 which fits against the underside of the side member 4. This flange has a depending stud 14 and a central bearing 15. The numeral 16 refers to a coil spring whose turns are spaced apart and the studs 10 and 14 receive the respective ends of said spring and form an anchorage therefor. A bearing rod 17 has its upper end connected to the stud 14 and this bearing rod extends down through the spring and through the bearing 11 and has its lower end formed into an enlarged head 18. The spring 16 is made of sufficient strength so that the spring 2 will yield to the ordinary load, but in passing over rough roads the spring 16 also comes into play, thus relieving the spring 2 of part of the stress and making the connection of the vehicle body to the axles the more yieldable.

When the spring 16 yields the rod 17 will slide freely through the bearing 11 and upon rebound the leaf spring 2 will approach its original position, placing the coil spring 16 under additional compression. This compression will be exerted each way, both against the leaf spring 2 and against the chassis, as the coil spring assumes its original or normal position, thus softening or relieving the rebound, and in case of extraordinary rebound the head 18 will contact against the underside of the bracket 6 to limit the range of the rebound and to prevent the disengagement of the parts.

What I claim is:

1. In a vehicle, the combination of an axle, a frame, a spring, secured to said axle, one end of which is attached to said frame through pivotal members, a bracket pivoted to the other end of said spring, a bearing carried by the bracket and adapted to operate against the underside of said spring when said bracket is moved downwardly, a bearing plate pivoted to said frame, a yieldable member interposed between said plate and bracket and whose respective ends are anchored to said plate and bracket respectively.

2. The combination with an axle, a frame, a leaf spring secured to said axle, one end of which is attached to said frame through pivotal connections, a bracket pivoted to the other end of said leaf spring, a bearing carried by the bracket and adapted to rest against the underside of said spring and limit the movement of said bracket, relative to said spring, in one direction, but it will permit movement of said bracket in the other, a bearing plate connected to said frame, a coil spring interposed between said plate and bracket, said bracket being provided with a bearing, a bearing rod connected at one end to said plate and located within the coil spring and whose other end extends through said bearing in said bracket and a head carried by said last mentioned end of said rod.

In testimony whereof I have signed my name to this specification in the presence of two subscribing witnesses.

HOARD LEE.

Witnesses:
C. P. MACK,
A. G. NORWOOD.